(12) United States Patent
Dibella et al.

(10) Patent No.: US 6,738,095 B2
(45) Date of Patent: May 18, 2004

(54) ORIENTATION-SENSITIVE ELECTRONIC VERTICAL SHUTTER RELEASE LOCK

(75) Inventors: James A. Dibella, Penfield, NY (US); Lynn V. Larsen, East Rochester, NY (US); Michael Venturino, Geneseo, NY (US); Albert Ferland, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/241,044

(22) Filed: Sep. 11, 2002

(65) Prior Publication Data

US 2004/0046869 A1 Mar. 11, 2004

(51) Int. Cl.[7] .......................... H04N 5/225; H04N 5/228
(52) U.S. Cl. ...................................... 348/373; 348/222.1
(58) Field of Search ........................ 348/207.99, 222.1, 348/373; 345/650; 235/472.01

(56) References Cited

U.S. PATENT DOCUMENTS

| | | | | |
|---|---|---|---|---|
| 4,710,008 A | * | 12/1987 | Tosaka et al. | 396/299 |
| 5,536,930 A | * | 7/1996 | Barkan et al. | 235/472.01 |
| 5,710,947 A | * | 1/1998 | Teremy et al. | 396/26 |
| 5,900,909 A | * | 5/1999 | Parulski et al. | 348/231.6 |
| 5,937,216 A | * | 8/1999 | Homma et al. | 396/95 |
| 6,148,149 A | | 11/2000 | Kagle | |
| 6,222,584 B1 | | 4/2001 | Pan | |
| 6,223,988 B1 | * | 5/2001 | Batterman et al. | 235/472.01 |

* cited by examiner

*Primary Examiner*—Ngoc-Yen Vu
*Assistant Examiner*—Paul W. Myers, III
(74) *Attorney, Agent, or Firm*—William F. Noval

(57) ABSTRACT

A digital camera comprising; a user controlled camera system; an orientation sensor for sensing whether the camera is in one of a horizontal or vertical positions; a user actuated switch located on the side of the camera when the camera is in the horizontal position; and means for selectively enabling/disabling said user controlled camera system as a function of the orientation of said orientation sensor.

3 Claims, 3 Drawing Sheets

ORIENTATION-SENSITIVE ELECTRONIC VERTICAL SHUTTER RELEASE LOCK

FIELD OF THE INVENTION

This invention relates in general to digital cameras and more particularly to a digital camera having a vertical shutter release switch which is enables/disabled as a function of camera orientation.

BACKGROUND OF THE INVENTION

A camera has external means by which the user can actuate the shutter mechanism to cause an image capture to occur. This mechanism is typically termed the "release" button. The release button typically is a 2-position switch which provide the functions of "half press" and "full press". Actuating half press wakes up the camera electronics for exposure setting and autofocus. The full press action then actuates the capture sequence. The camera will not see a full press without seeing a half press first.

Some cameras provide multiple release buttons, one on the top and one on the side. The top or horizontal button is used when taking pictures in a landscape mode. The side or vertical release can be used when holding the camera in a portrait orientation. The position of the vertical release button can cause it to be actuated inadvertently unless a lockout method is used to inhibit the ability to press the button. Lockout mechanisms to date have been done by a mechanical means preventing the switch from actuating. This mechanism adds additional components and cost to a design and provides only 2 modes of operation, LOCK or UNLOCK.

Digital cameras can also include an orientation sensor that indicates orientation of the camera when an image is captured. (See: U.S. Pat. No. 6,148,149, issued Nov. 14, 2000, inventor Kagle; U.S. Pat. No. 5, 900,909, issued May 4, 1999, inventors Parulski et al; U.S. Pat. No. 6,222,584 B1, issued Apr. 24, 2001, inventor Pan). None of these patents disclose a solution to the problem of disabling/enabling a vertical shutter release switch when a camera is orientation is changed.

SUMMARY OF THE INVENTION

According to the present invention, there is provided a solution to the problems discussed above.

According to a feature of the present invention, there is provided a digital camera comprising;

a user controlled camera system;

an orientation sensor for sensing whether said camera is in one of a horizontal or vertical positions;

a user actuated switch located on the side of said camera when said camera is in said horizontal position; and means for selectively enabling/disabling said user controlled camera system as a function of the orientation of said orientation sensor.

ADVANTAGEOUS EFFECT OF THE INVENTION

The invention has the following advantages.

1. A low cost, simple technique for disabling and enabling the function of a vertical release switch.

DETAILED DESCRIPTION OF THE INVENTION

Figure 1:
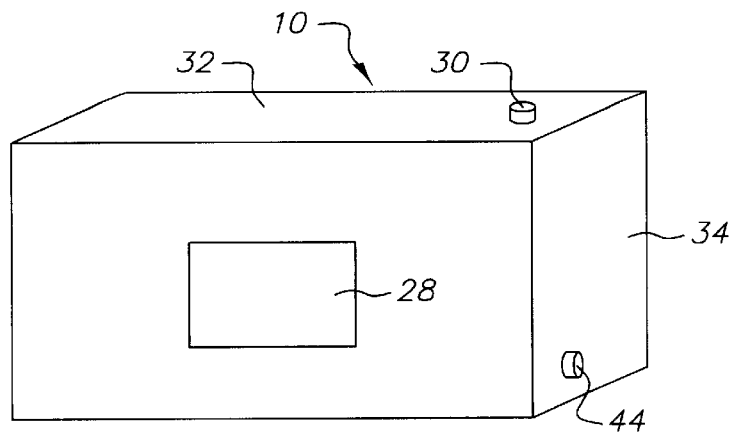
FIG. 1 is a diagrammatic view showing a digital camera incorporating the invention.
Figure 2:
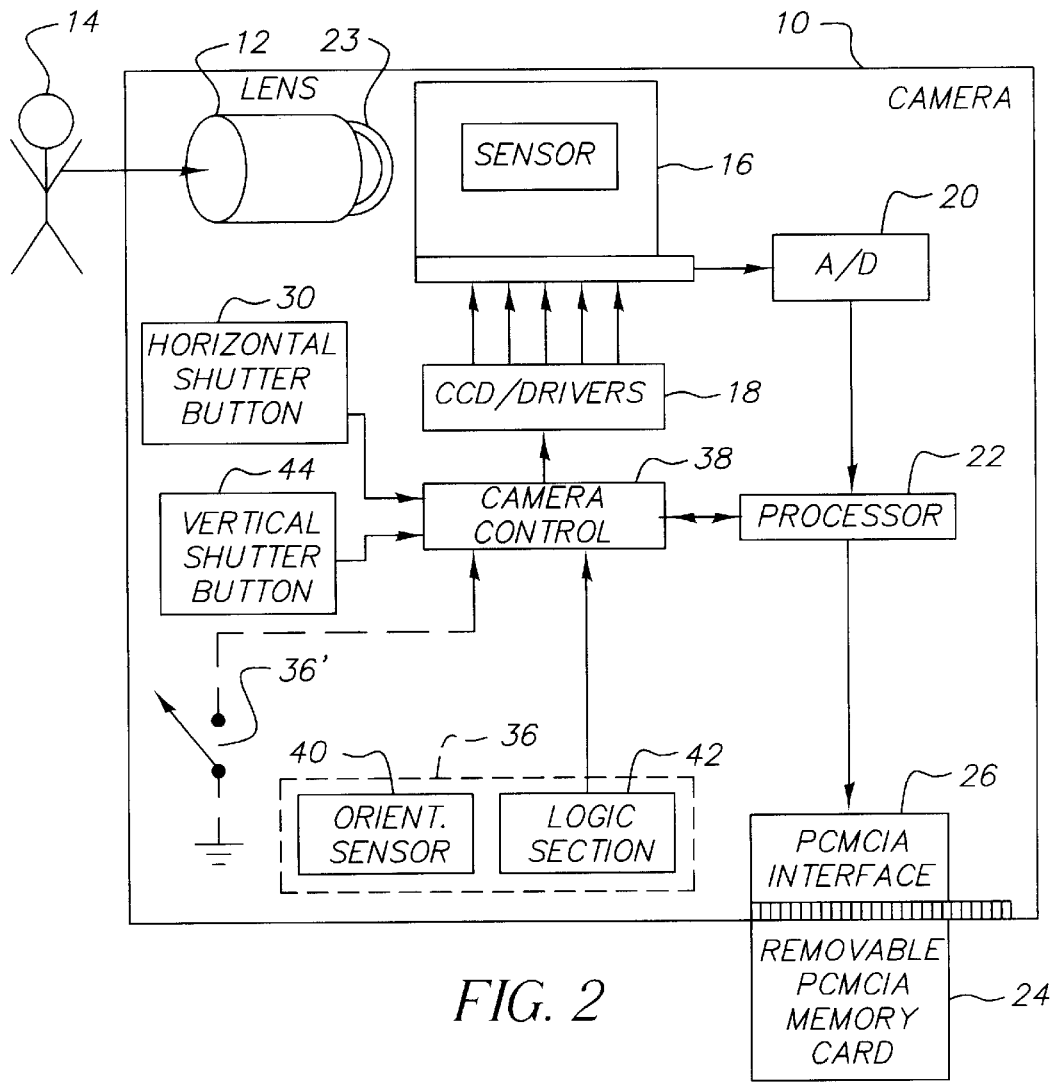
FIG. 2 is a block diagram showing the functional components of the camera of FIG. 1.

A block diagram of an electronic camera 10 incorporating the invention is shown in FIGS. 1 and 2. The camera is ordinarily a hand-held unit including a lens 12 for focusing an image of a subject 14 on an image sensor 16. On-off switch 36' is also provided. The sensor 16 is clocked by a driver circuit 18 to produce an analog image signal corresponding to a still image of the subject, and the image signal is converted to a digital image signal by an analog-to-digital (A/D) converter 20. The exposure time is controlled by a conventional diaphragm 23, which regulates the aperture of the lens 12, and by conventional electronic shuttering of the image sensor 16 by use of the driver circuit 18. (Alternatively, a mechanical shutter (not shown) can be used.) The digital image signal is processed by an image processor 22 and stored in a digital memory, such as a removable solid-state (PCMCIA) memory card 24, which has memory for storing a plurality of processed digital images. Interface (PCMCIA) 26 connects card 24 to processor 22. The image can be displayed on display 28 on the back panel of camera 10. Camera 10 includes a horizontal shutter button 30 on the top 32 of the camera 10 and a vertical shutter button 44 on the side 34 of camera 10. A problem arises when camera 10 is in the horizontal position that vertical shutter button 44 can be accidentally actuated by the camera user's hand. This can result in an unwanted exposure.

As an aspect of the invention, the camera includes an orientation determination section 36, which determines whether the camera is in the horizontal "landscape" orientation, or the first (clockwise) or second (counterclockwise) vertical "portrait" orientations. The orientation determination section 36 includes one or more orientation or tilt sensors 40 and a logic section 42 that produces an orientation signal indicating the orientation of the camera relative to the subject. Orientation or tilt sensor 40 may be a photointeruptor sensor which can detect tilt in either direction, a mercury switch, gyroscope device, or the like. The orientation signal is applied to a camera control interface 38. The orientation signal indicates at least the vertical orientation of the camera (the absence thereof, in that case, indicating a horizontal orientation), or, alternatively, the orientation signal may provide positive indication of either the vertical or the horizontal orientation of the camera. When signaled by a shutter button 30 or 44, the camera control interface 38 instructs driver circuit 18 to capture an image on the sensor 16. At the same time, the interface 38 applies the orientation signal from the orientation determination section 36 to the image processor 22. If processor 22 determines that vertical shutter button 44 has been actuated while camera 10 is in a horizontal position, image acquisition by sensor 16 will be prevented in accordance with the present invention.

According to the invention, a means by which a sensor internal to the camera is used to enable and disable the function of the vertical release switch. In the digital camera application, a tilt sensor is used to detect the landscape to portrait rotation of the camera, left and right rotation of the camera along the optical axis. If the camera is rotated when the switch is enabled.

Once the sensor and support electronics is in place to control the "lock" of the release switch the design can be enhanced at essentially no cost to the product. Through soft logic, i.e., signals controlled by the programming of the microprocessor, the "lockout" feature can be extended to other user controllable functions. This creates a means by which the user can enable or disable the sensor, by allowing the user to completely lockout the release switch.

Figure 3:
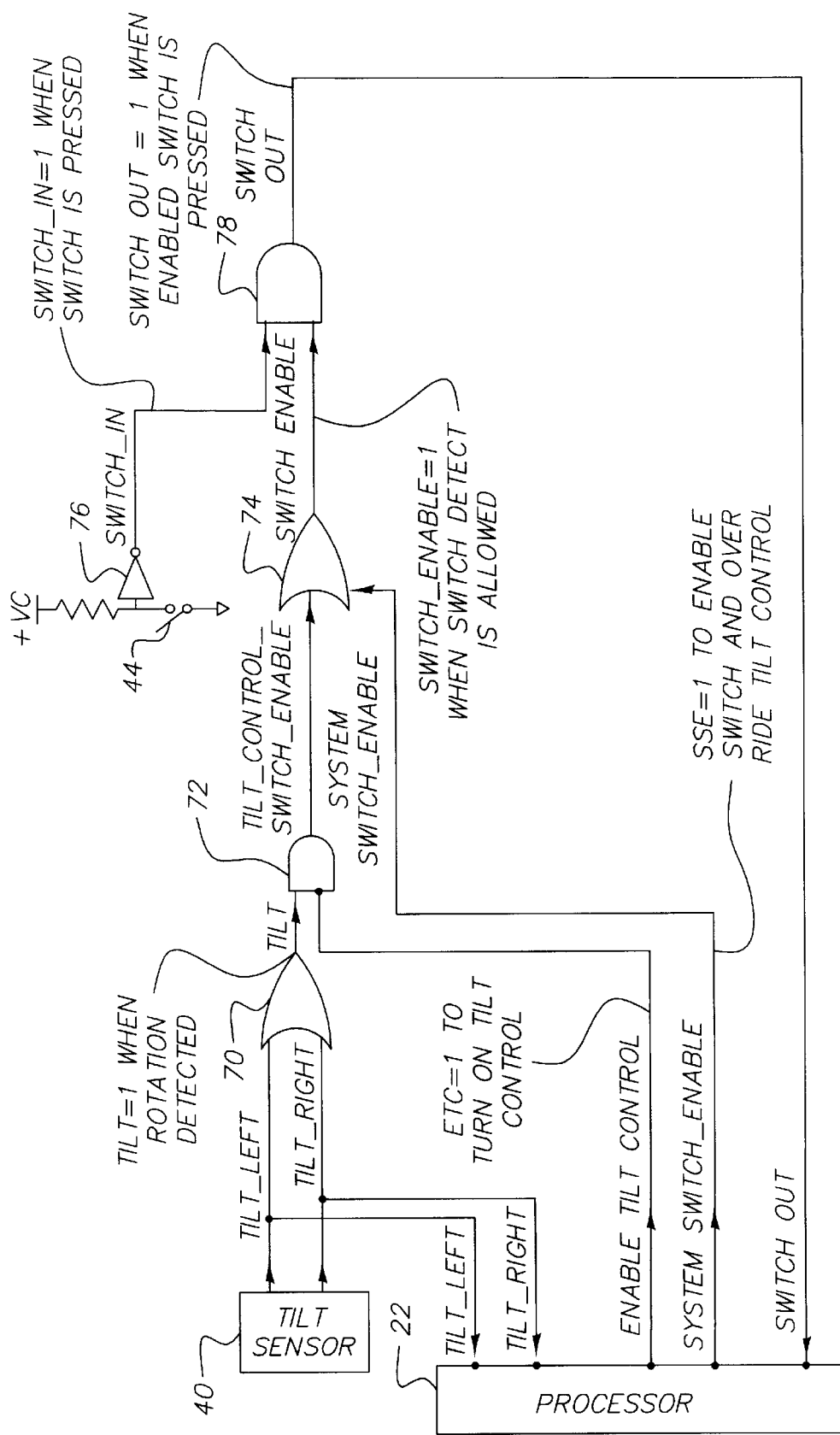
FIG. 3 is a schematic diagram of an embodiment of the present invention.
Figure 4:
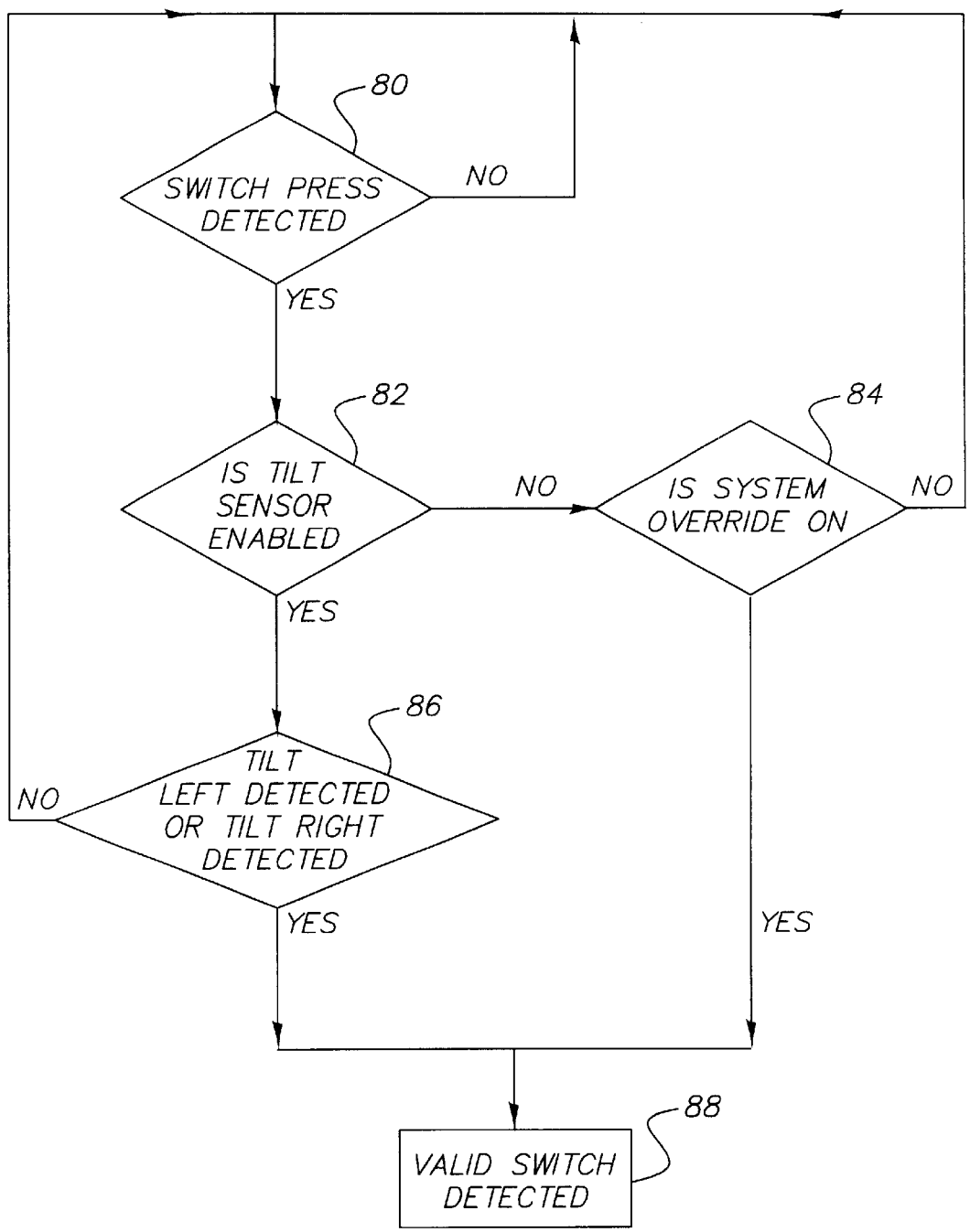
FIG. 4 is a logic flow diagram useful in explaining the embodiment of FIG. 3.

Referring now to FIGS. 3 and 4, there is shown an embodiment of the present invention. As shown, sensor 40 produces a tilt left output signal when camera 10 is tilted left and a tilt right output signal when camera 10 is tilted right. Both signals=1 and are applied to logic element 70 which produces a tilt output 1 which is applied to logic element 72. When an Enabled Tilt Control signal=1 from processor 22 is also applied to logic element 72, element 72 produces a Tilt Control Switch Enable signal which is applied to logic element 74. A System Switch Enable signal produced by processor 22 can also be applied to logic element 74. The Switch Enable output of logic element 74 equals 1 when switch detect is allowed. When switch 44 is activated, logic element 76 produces a Switch On=1 signal. The signals from elements 74 and 76 are applied to logic element 78 which produces a Switch Out=1 signal when an enabled switch is pressed. The Switch Out signal is sent to processor 22.

FIG. 4 depicts a logic flow diagram of the technique according to the invention. As shown, at diamond 80 it is determined whether the switch 44 press (activation) has been detected. If NO, the flow recycles back to the input of diamond 80. If YES, it is determined at diamond 82 whether the tilt sensor 40 has been enabled. If NO, it is determined at diamond 84 if the system override is on. If YES, it is determined at diamond 86 whether Tilt Left of Tilt Right have been detected. If NO, the flow recycles to the input of diamond 80. If the decision is NO at diamond 84, the flow also recycles to the input of diamond 80. If the decision at either of diamonds 84 or 86 is YES, a valued switch detected output 88 is produced.

It will be understood that other user controlled camera functions and systems can be disabled/enabled by a camera orientation sensor.

The invention has been described in detail with particular reference to certain preferred embodiments thereof, but it will be understood that variations and modifications can be effected within the spirit and scope of the invention.

PARTS LIST 10 camera
12 lens
14 image of subject
16 sensor
18 driver circuit
20 A/D converter
22 image processor
23 analog-to-digital
24 solid state memory card
28 display
30 horizontal shutter button
32 top of camera
34 side of camera
36 orientation determination section
38 camera control
40 tilt sensor
42 logic section
44 vertical shutter button
72 logic element
74 logic element
76 logic element
78 logic element
80 switch press detected
82 tilt sensor enabled
84 system override on
86 tilt left/right detected
88 valid switch detected

What is claimed is:

1. A digital camera comprising;

an image capture system for capturing an image of a scene;

wherein when said camera is in a normal horizontal position, said image capture system captures a landscape-type image, and wherein when said camera is in a vertical position, oriented 90° from said horizontal position, said image capture system captures a portrait type image;

an orientation sensor for sensing whether said camera is in one of said horizontal or vertical positions;

an image capture switch located on the side of said camera when said camera is in said horizontal position for enabling activation of said image capture system; and means for selectively preventing enablement of activation of said image capture system by said image capture switch in response to said orientation sensor sensing that said camera is in said horizontal position.

2. The camera of claim 1 wherein said image capture system includes a shutter assembly and wherein said image capture switch enables activation of said shutter assembly.

3. The digital camera of claim 1 wherein said image capture switch produces a signal when actuated which effects activation of said image capture system and wherein said means for selectively preventing, selectively prevents said signal from effecting activation of said image capture system.

* * * * *